(12) United States Patent
Sim

(10) Patent No.: US 11,383,374 B2
(45) Date of Patent: Jul. 12, 2022

(54) PALLET TRANSFER SYSTEM

(71) Applicant: DOOSAN MACHINE TOOLS CO., LTD., Chang-won-si (KR)

(72) Inventor: Jae Doo Sim, Changwon-si (KR)

(73) Assignee: DOOSAN MACHINE TOOLS CO., LTD., Chang-Won-si (KR)

( * ) Notice: Subject to any disclaimer, the term of this patent is extended or adjusted under 35 U.S.C. 154(b) by 0 days.

(21) Appl. No.: 14/876,895

(22) Filed: Oct. 7, 2015

(65) Prior Publication Data

US 2016/0101520 A1    Apr. 14, 2016

(30) Foreign Application Priority Data

Oct. 8, 2014  (KR) .......................... 10-2014-0135612

(51) Int. Cl.
*B25J 9/00* (2006.01)
*G05B 19/418* (2006.01)

(52) U.S. Cl.
CPC ............ *B25J 9/00* (2013.01); *G05B 19/4189* (2013.01); *G05B 2219/31313* (2013.01); *G05B 2219/43099* (2013.01); *Y02P 90/02* (2015.11)

(58) Field of Classification Search
USPC ........................................................ 700/217
See application file for complete search history.

(56) References Cited

U.S. PATENT DOCUMENTS

| | | | | |
|---|---|---|---|---|
| 4,160,937 A * | 7/1979 | Fiorini | ............... | B23Q 15/12 318/634 |
| 5,920,480 A * | 7/1999 | Nakamura | ............. | B23Q 41/08 700/114 |
| 6,052,627 A * | 4/2000 | Nakamura | ............. | B21D 43/20 700/182 |
| 7,550,681 B2 * | 6/2009 | Wang | ....................... | G01G 7/00 177/1 |
| 7,845,483 B2 * | 12/2010 | Noguchi | ............... | B23Q 7/007 198/346.3 |
| 2004/0019394 A1 * | 1/2004 | Red | .................... | G05B 19/4097 700/19 |
| 2006/0208893 A1 * | 9/2006 | Anson | ............... | G08B 13/1472 700/215 |

(Continued)

FOREIGN PATENT DOCUMENTS

| | | |
|---|---|---|
| JP | H3-32542 A | 2/1991 |
| KR | 10-2010-0057130 A | 5/2010 |

(Continued)

OTHER PUBLICATIONS

Office Action issued in corresponding Korean Patent Application No. 10-2014-0135612 dated Mar. 30, 2020.

(Continued)

*Primary Examiner* — Kyle O Logan
(74) *Attorney, Agent, or Firm* — STIP Law Group, LLC

(57) ABSTRACT

The present disclosure relates to a pallet transfer system, including: a set-up structure that inserts a material into and withdraw a material out from a pallet; a pallet storage, on which the pallet is loaded; a material processing device that processes the material; a pallet transfer device that transfers the pallet to the set-up structure, the pallet storage, or the material processing device; a detector that detects a load applied to the pallet transfer device; and a controller that controls a speed of the pallet transfer device according to the information detected by the detector.

11 Claims, 4 Drawing Sheets

(56) References Cited

U.S. PATENT DOCUMENTS

| | | | |
|---|---|---|---|
| 2009/0206225 A1 | 8/2009 | Kobayashi | |
| 2010/0018836 A1 | 1/2010 | Kikkawa et al. | |
| 2011/0100783 A1* | 5/2011 | Baba | B65G 35/06 198/606 |
| 2012/0290126 A1* | 11/2012 | Combs | G05B 19/4189 700/230 |
| 2012/0317884 A1 | 12/2012 | Park | |
| 2013/0251482 A1* | 9/2013 | Issing | B65G 1/06 414/800 |
| 2013/0302128 A1* | 11/2013 | Miyazaki | B23Q 7/1426 29/33 P |
| 2014/0178144 A1 | 6/2014 | Nakano et al. | |
| 2015/0266151 A1* | 9/2015 | Komatsu | B23Q 3/15713 483/1 |
| 2016/0263718 A1* | 9/2016 | Miyazaki | B23Q 7/1431 |
| 2022/0089308 A1* | 3/2022 | Monti | B65B 7/20 |

FOREIGN PATENT DOCUMENTS

| | | |
|---|---|---|
| KR | 10-2011-0070941 A | 6/2011 |
| KR | 10-2014-0078461 A | 6/2014 |
| WO | WO 2014/013247 A2 | 1/2014 |

OTHER PUBLICATIONS

DMG Mori Co., Ltd., Linear Pallet Pool System, Jan. 2016.

Hwacheon Asia Pacific Pte., Ltd.,Automation Line with High Flexibility in CNC Machining, May 2021, Retrieved from https://hwacheonasia.com/automation-line-with-high-flexibility-in-cnc-machining/.

Sadasivam, L., Archenti, A., & Sandberg, U., (2018). Machine tool ability representation: a review. Journal of Machine Engineering, 18(2), 5-16. https://doi.org/10.5604/01.3001.0012.0919.

* cited by examiner

PALLET TRANSFER SYSTEM

CROSS-REFERENCE TO RELATED APPLICATIONS

This application is based on and claims priority from Korean Patent Application No. 10-2014-0135612, filed on Oct. 8, 2014, with the Korean Intellectual Property Office, the disclosure of which is incorporated herein in its entirety by reference.

TECHNICAL FIELD

The present disclosure relates to a transfer system transferring a material, and more particularly, to a pallet transfer system transferring a pallet on which a material is mounted.

BACKGROUND

In general, a material is mounted on a pallet, and a pallet transfer device transfers the pallet mounted with the material.

The pallet transfer device may transfer a completely processed workpiece to the outside.

A pallet transfer device in the related art is set to a predetermined load value regardless of a load applied to the pallet transfer device. Particularly, the pallet transfer device in the related art is always set to a maximum allowable value, by which the pallet transfer device is capable of transferring a material, without considering whether a material exists on the pallet or a weight of a material, so that it is difficult to efficiently control a transfer speed of the pallet transfer device.

That is, when the pallet transfer device transfers the pallet, a load applied to the pallet transfer device is not considered, and thus there is a problem in that it is difficult to effectively control a speed of the pallet transfer device.

Even when the pallet transfer device transfers materials with various weights, the pallet transfer device is set to a predetermined allowable load value, and thus it is difficult to effectively control a speed of the pallet transfer device.

SUMMARY

The present disclosure has been made in an effort to provide a pallet transfer system which is capable of effectively controlling a pallet transfer device.

An exemplary embodiment of the present disclosure provides a pallet transfer system, including: a set-up structure configured to insert a material into and withdraw a material out from a pallet; a pallet storage, on which the pallet is loaded; a material processing device configured to process the material; a pallet transfer device configured to transfer the pallet to the set-up structure, the pallet storage, or the material processing device; a detector configured to detect information on a load applied to the pallet transfer device; and a controller configured to control a transfer speed of the pallet transfer device according to the load information detected by the detector.

The detector may detect at least one selected from the group consisting of whether a pallet is mounted on the pallet transfer device, whether a material is mounted on the pallet, a weight of a material mounted on the pallet, a number of the pallet, and a number of a material mounted on the pallet.

The detector may include: a first detector configured to detect a weight of the material before processing; and a second detector configured to detect a weight of the material after processing.

The first detector and the second detector may be installed in the set-up structure or the material processing device.

The controller may calculate a weight of the material after processing by using a processing program input into the material processing device.

The controller may control one or more of a driving revolutions per minute (RPM) and an accelerating time constant of the pallet transfer device.

The driving RPM or the accelerating time constant of the pallet transfer device may be calculated by Equation 1 or 2 below.

$$H = C + (F - C) * \left(\frac{J - E}{B - A}\right) \qquad \text{Equation 1}$$

$$I = D + (G - D) * \left(\frac{J - E}{B - A}\right) \qquad \text{Equation 2}$$

Herein, A may be a weight of an empty pallet, B may be a weight of pallets when materials are maximally loaded, C may be an appropriate driving RPM of the pallet transfer device when the materials are maximally loaded, D may be an appropriate accelerating time constant of the pallet transfer device when the materials are maximally loaded, E may be a weight of a material currently laid on the pallet transfer device, F may be an appropriate driving RPM of the pallet transfer device when an empty pallet is transferred, G may be an appropriate accelerating time constant of the pallet transfer device when an empty pallet is transferred, H may be a driving RPM of the pallet transfer device, I may be an accelerating time constant of the pallet transfer device, and J may be a weight of materials when materials are maximally loaded.

The controller may determine a transfer position of the pallet by detecting an operation state of the material processing device, and control a transfer position of the pallet transfer device.

The pallet transfer system may further include an input structure operated by a user, and configured to input the load applied to the pallet transfer device, in which when the load information is not detected by the detector, the controller may control a transfer speed of the pallet transfer device based on load information input by the input structure.

Another exemplary embodiment of the present disclosure provides a pallet transfer system, including: a set-up structure configured to insert a material into and withdraw a material out from a pallet; a pallet storage, on which the pallet is loaded; a material processing device configured to process the material; a pallet transfer device configured to transfer the pallet to the set-up structure, the pallet storage, or the material processing device; an input structure operated by a user, and configured to input the load information applied to the pallet transfer device; and a controller configured to control a transfer speed of the pallet transfer device according to the load information input by the input structure.

The controller may control one or more of a driving revolutions per minute (RPM) and an accelerating time constant of the pallet transfer device.

According to the exemplary embodiments of the present disclosure, the pallet transfer system may effectively control the pallet transfer device by detecting a load applied to the pallet transfer device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
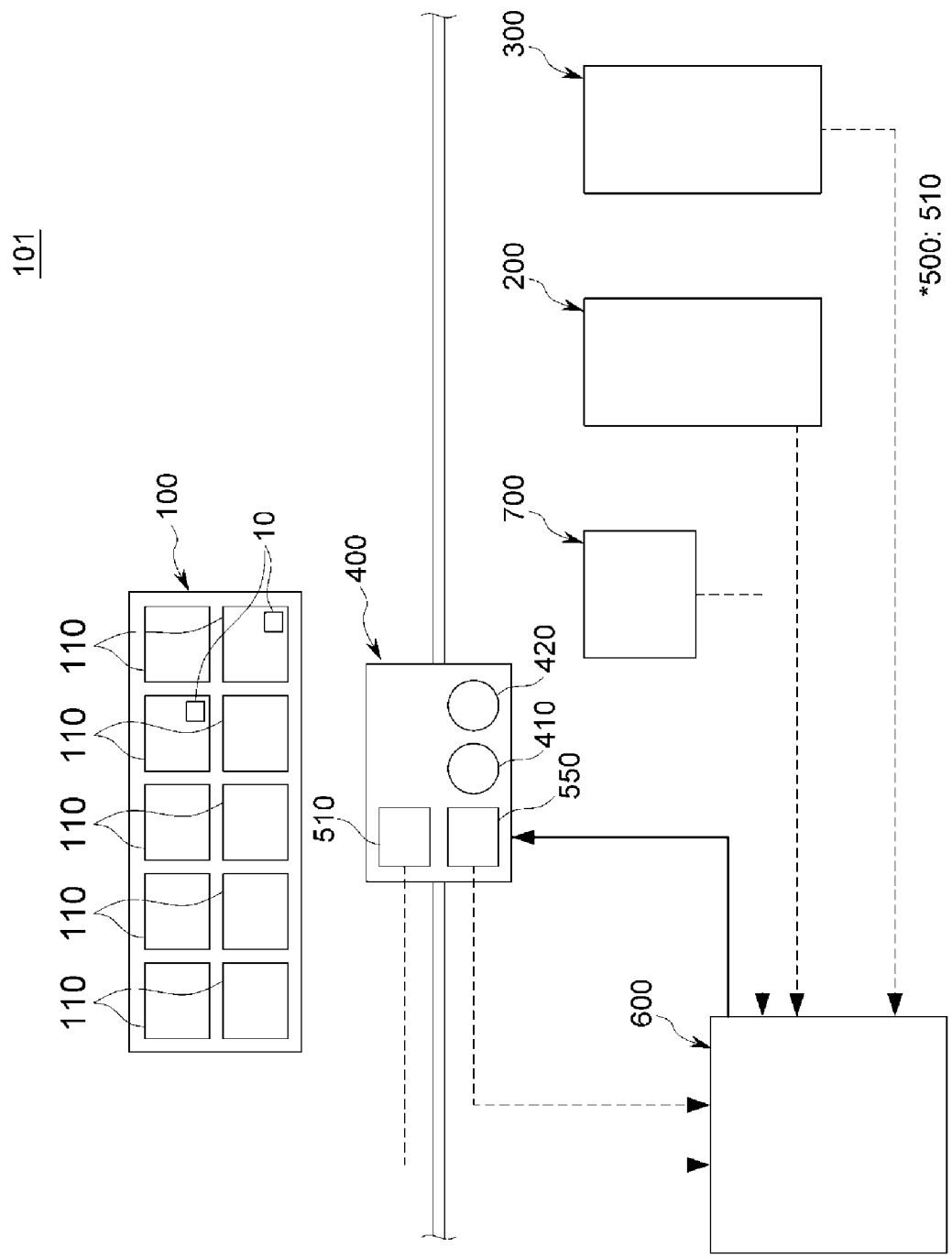
FIG. 1 is a configuration diagram illustrating a pallet transfer system according to a first exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail so as for those skilled in the art to carry out the present disclosure with reference to the accompanying drawings. The present disclosure may be implemented in various different ways, and is not limited to the exemplary embodiments described herein.

In several exemplary embodiments, constituent elements having the same configuration will be representatively described using the same reference numerals in a first exemplary embodiment, and a second exemplary embodiment will be described regarding only constituent elements that are different from the constituent elements described in the first exemplary embodiment.

The drawings are schematically illustrated, and are not illustrated in accordance with the scales of the drawings. Relative dimensions and ratios of the parts illustrated in the drawings are exaggerated or reduced in terms of sizes thereof for clarification of the drawings and convenience, and any dimension is only illustrative, and is not limited. Further, the same workpieces, elements, or components illustrated in two or more drawings are designated by the same reference numerals so as to illustrate similar features.

The exemplary embodiments of the present disclosure specifically present as ideal exemplary embodiments of the present disclosure. As a result, various modifications of the drawings are expected. Therefore, the exemplary embodiments are not limited to specific forms in regions illustrated in the drawings, and for example, include modifications of forms by the manufacture.

Hereinafter, a pallet transfer system 101 according to a first exemplary embodiment of the present disclosure will be described with reference to FIG. 1.

As illustrated in FIG. 1, the pallet transfer system 101 according to the first exemplary embodiment of the present disclosure includes a set-up structure 300 for inserting a material 10 onto and withdrawing the material 10 out from a pallet 110, a pallet storage 100, a material processing device 200, a pallet transfer device 400, a detector 500, and a controller 600.

The material 10 is a target for a processing operation, which is mounted on the material processing device 200 for performing various processing operations, such as cutting, boring, and drilling.

The pallet 110 may have a loaded plate shape for effectively transferring the material 10 regardless of shapes and sizes of various materials 10. That is, the material 10 may be positioned on the pallet 110 and transferred together with the pallet 110 when the pallet 110 is transferred.

A workpiece, which passes through the material processing device 200 and is completely processed, may be loaded on the pallet 110.

The set-up structure 300 may enable a user to mount the material 10 on the pallet 110 or enable a user to withdraw out a completely processed workpiece loaded on the pallet 110. Particularly, a separate automation process for inserting the material 10 onto and withdrawing the material 10 out from the pallet 110 by the set-up structure 300 may be further provided.

That is, the set-up structure 300 may withdraw out the completely processed workpiece or insert the material 10 for processing onto the pallet 110.

The pallet 110 is loaded in the pallet storage 100. Particularly, the plurality of pallets 110 may be loaded in the pallet storage 100. For example, the materials 10 to be transferred to the material processing device 200 may be mounted on the pallets 110, respectively, and wait for transferring.

Otherwise, the pallet 110, on which the material 10 is not mounted, may also be loaded in the pallet storage 100. That is, the plurality of pallets 110 may be loaded in the pallet storage 100 regardless of whether the material 10 is mounted on the pallet 110.

The material processing device 200 may include a machine tool for a processing operation appropriate to a processing purpose of the material 10.

The pallet transfer device 400 may transfer the material 10 or the completely processed workpiece while moving between the set-up structure 300, the pallet storage 100, and the material processing device 200.

Particularly, the pallet transfer device 400 may transfer the pallet 110 while moving an installed path.

The detector 500 may detect a load applied to the pallet transfer device 400. For example, the detector 500 may be installed in the pallet transfer device 400 to detect a load applied to the pallet transfer device 400.

The pallet transfer system 101 according to the first exemplary embodiment of the present disclosure may detect whether there exists the pallet 110 mounted on the pallet transfer device 400 or whether there exists the material 10 mounted on the pallet 110 based on the load. Particularly, the detector 500 may detect whether the pallet 110 is mounted on the pallet transfer device 400 or there exists the material 10 on the mounted pallet 110. That is, the detector 500 may detect a load applied to the pallet transfer device 400.

For example, the detector 500 detecting whether the pallet 110 is mounted on the pallet transfer device 400 or there exists the material 10 may be a position detection sensor or a sensor capable of detecting a unique number assigned to the pallet 110.

The controller 600 may control a transfer speed of the pallet transfer device 400 from information detected by the detector 500.

Particularly, a transfer speed of the pallet transfer device 400 may be controlled by the controller 600 according to whether the pallet 110 is mounted or there exists the material 10, which are detected by the detector 500.

For example, when the detector 500 detects that the pallet 110 or the material 10 is mounted on the pallet transfer device 400, a transfer speed of the pallet transfer device 400 may be controlled under a condition, in which a load applied to a driving unit of the pallet transfer device 400 is relatively larger than that of a case where the detector 500 detects that the pallet 110 or the material 10 is not mounted on the pallet transfer device 400.

That is, when the pallet transfer device 400 moves for transferring the empty pallet 110, on which the material 10 is not mounted, or transferring the pallet 110 positioned on the material processing device 200 or the set-up structure 300 in a state where the pallet 110 is not mounted, the pallet transfer device 400 may be controlled under a condition, in which a load applied to the driving unit of the pallet transfer device 400 is relatively smaller, compared to a case where the pallet transfer device 400, on which the mounted material 10 is mounted, moves.

Accordingly, the pallet transfer system 101 according to the first exemplary embodiment of the present disclosure may effectively control a transfer speed of the pallet transfer device 400 by a load detected by the detector 500, compared to the pallet transfer device in the related art, which is always transferred by an input of a maximum load value applied to the driving unit of the pallet transfer device.

It is possible to efficiently decrease a processing time of the pallet transfer system 101 under the control of a transfer speed of the pallet transfer device 400.

The pallet transfer device 400 of the pallet transfer system 101 according to the first exemplary embodiment of the present disclosure may be controlled by one or more of a driving revolutions per minute (RPM) 410 and an accelerating time constant 420.

The driving RPM 410 is the number of rotations of the driving unit driving the pallet transfer device 400. Particularly, when the driving unit is a motor, the driving RPM 410 is the number of rotations of the motor.

The accelerating time constant 420 is a variable for controlling acceleration or deceleration of the driving unit.

Accordingly, the pallet transfer device 400 of the pallet transfer system 101 according to the first exemplary embodiment of the present disclosure may effectively control a transfer speed or transfer acceleration of the pallet transfer device 400 by controlling one or more of the driving RPM 410 and the accelerating time constant 420 according to load information detected by the detector 500.

Accordingly, a transfer speed or transfer acceleration may be controlled by detecting a load applied to the pallet transfer device 400 by the detector 500 and adjusting a load of the driving unit of the pallet transfer device 400 required according to the transfer of the pallet 110 or the transfer of the material 10.

The controller 600 of the pallet transfer system 101 according to the first exemplary embodiment of the present disclosure may detect an operation state of the material processing device 200.

Particularly, the pallet transfer system 101 according to the first exemplary embodiment of the present disclosure may further include a state detector 550 capable of detecting a current operation state and a current operation situation of the material processing device 200.

The controller 600 may control a transfer position of the pallet transfer device 400 by detecting an operation state of the material processing device 200 by the state detector 550.

For example, the controller 600 may control whether to transfer the pallet 110, which is mounted with the material 10 in the pallet storage 100 to the material processing device 200 or whether to transfer the pallet 110, on which the material 10 is set up by the set-up structure 300, to the pallet storage 100 by detecting an operation state of the material processing device 200.

When the pallets 110, on which various materials 10 are mounted, are loaded in the pallet storage 100, the pallet transfer device 400 may effectively transfer the pallets 110 and the materials 10 mounted on the pallets 110 considering an operation time and a preparation time differently consumed for processing for each material 10.

The pallet transfer system 101 according to the first exemplary embodiment of the present disclosure may further include an input structure 700 inputting a load.

The input structure 700 may be operated by a user and input a load applied to the pallet transfer device 400.

In this case, the controller 600 may control a transfer speed of the pallet transfer device 400 by selectively detecting the load input by the input structure 700 and the load detected by the detector 500.

For example, the controller 600 may control a transfer speed of the pallet transfer device 400 based on the load information detected by the detector 500 compared to the input by the input structure 700.

Particularly, when the load information cannot be detected due to a failure of the detector 500, the controller 600 may control a transfer speed of the pallet transfer device 400 based on information on the load applied to the pallet transfer device 400 input by the user.

That is, the pallet transfer system 101 according to the first exemplary embodiment of the present disclosure further includes the input structure 700, thereby preventing an operation error of the controller 600 when the detector 500 has a failure.

By the aforementioned configuration, the pallet transfer system 101 according to the first exemplary embodiment of the present disclosure may effectively control a speed of the pallet transfer device 400 according to a load applied to the pallet transfer device 400.

Accordingly, in a case where the pallet 110 is not mounted in the pallet transfer device 400 according to the load information detected by the detector 500, the pallet transfer device 400 may be transferred under a relatively small load condition compared to a case where the pallet 110 is mounted on the pallet transfer device 400, thereby improving performance and a process speed of the pallet transfer system 101. Further, it is possible to effectively detect the load applied to the driving unit of the pallet transfer device 400 by the detector 500, thereby increasing a lifespan of the driving unit of the pallet transfer device 400.

The controller 600 may control a transfer position of the pallet transfer device 400 by detecting an operation state of the material processing device 200, thereby effectively controlling shortness of the material 10 supplied to the material processing device 200, which may be generated by different operation times of the material processing device 200 while various materials 10 are processed, the number of pallets 110 loaded in the pallet storage 100, or the like.

Particularly, the controller 600 may recognize a position, to which the pallet transfer device 400 needs to move, by detecting a position of the pallet transfer device 400 by a position detector 510.

Hereinafter, a pallet transfer system 102 according to a second exemplary embodiment of the present disclosure will be described with reference to FIG. 2.

Figure 2:
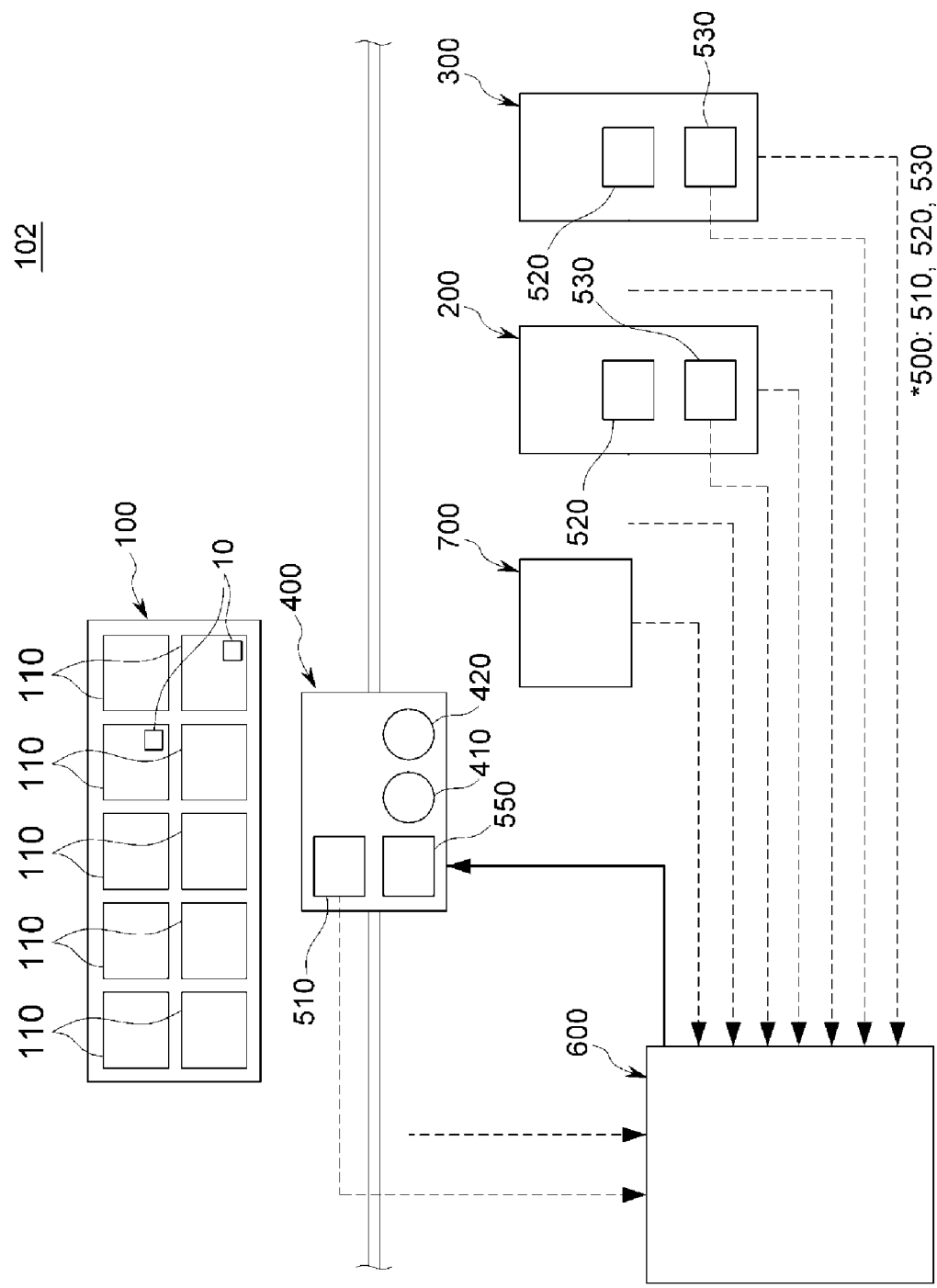
FIG. 2 is a configuration diagram illustrating a pallet transfer system according to a second exemplary embodiment of the present disclosure.

As illustrated in FIG. 2, a configuration of the pallet transfer system 102 according to the second exemplary embodiment of the present disclosure is configured identically to the configuration of the pallet transfer system 101 according to the first exemplary embodiment of the present disclosure, except for a configuration that a detector 500 is capable of measuring a weight.

The detector 500 of the pallet transfer system 102 according to the second exemplary embodiment of the present disclosure may further detect a weight applied to a pallet transfer device 400.

That is, the detector 500 may detect whether a pallet 110 is mounted on the pallet transfer device 400 or a weight of a material mounted on the pallet 110 by detecting a weight applied to the pallet transfer device 400.

One or more of a driving RPM 410 of the pallet transfer device 400 and an accelerating time constant 420 of the pallet transfer device 400 may be controlled according to information detected by the detector 500.

In this case, an appropriate driving RPM H, which needs to be currently applied to the pallet transfer device 400, or an accelerating time constant I, which needs to be applied to the pallet transfer device 400, are as following equations.

A(kg): Weight of empty pallet
B(kg): Weight of pallets when materials are maximally loaded
C(rpm): Appropriate driving RPM of pallet transfer device when materials are maximally loaded
D(ms): Appropriate accelerating time constant of pallet transfer device when materials are maximally loaded
E(kg): Weight of material currently laid on pallet transfer device
F(rpm): Appropriate driving RPM of pallet transfer device when empty pallet is transferred
G(ms): Appropriate accelerating time constant of pallet transfer device when empty pallet is transferred
H(rpm): Appropriate driving RPM to be currently applied to pallet transfer device
I(ms): Appropriate accelerating time constant to be currently applied to pallet transfer device
J(kg): Weight of materials when materials are maximally loaded $$H = C + (F - C) * \left(\frac{J - E}{B - A}\right) \quad \text{Equation 1}$$

$$I = D + (G - D) * \left(\frac{J - E}{B - A}\right) \quad \text{Equation 2}$$

The detector 500 according to the second exemplary embodiment of the present disclosure may include a first detector 520 detecting a weight of a material before processing, and a second detector 530 detecting a weight of the material after processing.

The first detector 520 may detect a weight of the material 10 supplied before passing through the material processing device 200.

The second detector 530 may detect a weight of the material 10 (that is, a workpiece, in which the supplied material is completely processed) passing through the material processing device 200.

That is, the first detector 520 and the second detector 530 may more precisely control a speed of the pallet transfer device 400 considering a case where a completely processed material (workpiece) 10, which has a different weight from that of the material 10 supplied to the material processing device 200, is mounted on the pallet 110.

The pallet transfer system 102 according to the second exemplary embodiment of the present disclosure may include only any one of the first detector 520 and the second detector 530.

In this case, when only the first detector 520 is included, a controller 600 may control the pallet transfer device 400 by calculating a weight of the material 10 passing through the material processing device 200 as described below or identically using a value detected by the first detector 520.

When only the second detector 530 is included, the controller 600 may control the pallet transfer device 400 by setting a weight of the material 10 before passing through the material processing device 200 to a maximally allowable weight, by which the pallet transfer device 400 is capable of transferring the material 10.

The first detector 520 and the second detector 530 may be installed at a front or rear side of a set-up structure 300 or the material processing device 200.

Otherwise, the controller 600 according to the second exemplary embodiment of the present disclosure may more precisely control a speed of the pallet transfer device 400 by detecting a weight of the material 10, which is supplied before passing through the material processing device 200, by the detector 500, and calculating a weight of the material 10 processed by the material processing device 200 based on a processing program pre-input into the material processing device 200.

In this case, a plurality of separate detectors 500 is not required, and the controller 600 may effectively calculate the weight of the material after passing through the material processing device 200 by utilizing the processing program pre-input into the material processing device 200.

Otherwise, the controller 600 according to the second exemplary embodiment of the present disclosure may more precisely control a speed of the pallet transfer device 400 by detecting a weight of the material 10, which is supplied before passing through the material processing device 200 by the detector 500, and calculating a weight of the material after passing through the material processing device 200 by detecting a weight of a chip generated during a material processing operation of the material processing device 200.

In order to measure the weight of the chip generated during the material processing operation, the detector 500 for calculating a weight of the material after passing through the material processing device 200 may be installed in the material processing device 200. Particularly, in order to measure the weight of the chip, the detector 500 may be installed in a chip basket of the material processing device 200. Otherwise, the detector 500 for calculating the weight of the material after passing through the material processing device 200 may be mounted in the set-up structure 300, by which the pallet 110, on which the completely processed material 10 is mounted, may be inserted or withdrawn out.

In this case, it is possible to more accurately detect weight information of the material compared to calculating a weight of the material after passing through the material processing device 200 by utilizing the pre-input processing program.

By the aforementioned configuration, the pallet transfer system 102 according to the second exemplary embodiment of the present disclosure may detect whether the pallet 110 is mounted and a weight of a material mounted on the pallet 110, by the detector 500, thereby effectively controlling a transfer speed or transfer acceleration of the pallet transfer device 400.

Since it is possible to detect and calculate weight information of a material before and after passing through the material processing device 200, the controller 600 may effectively control a transfer speed or transfer acceleration of the pallet transfer device 400 moving from the material processing device 200 to the set-up structure 300.

That is, the controller 600 may effectively transfer the pallet 110 transferred by the pallet transfer device 400 considering a decreased weight of the material after processing.

Figure 3:
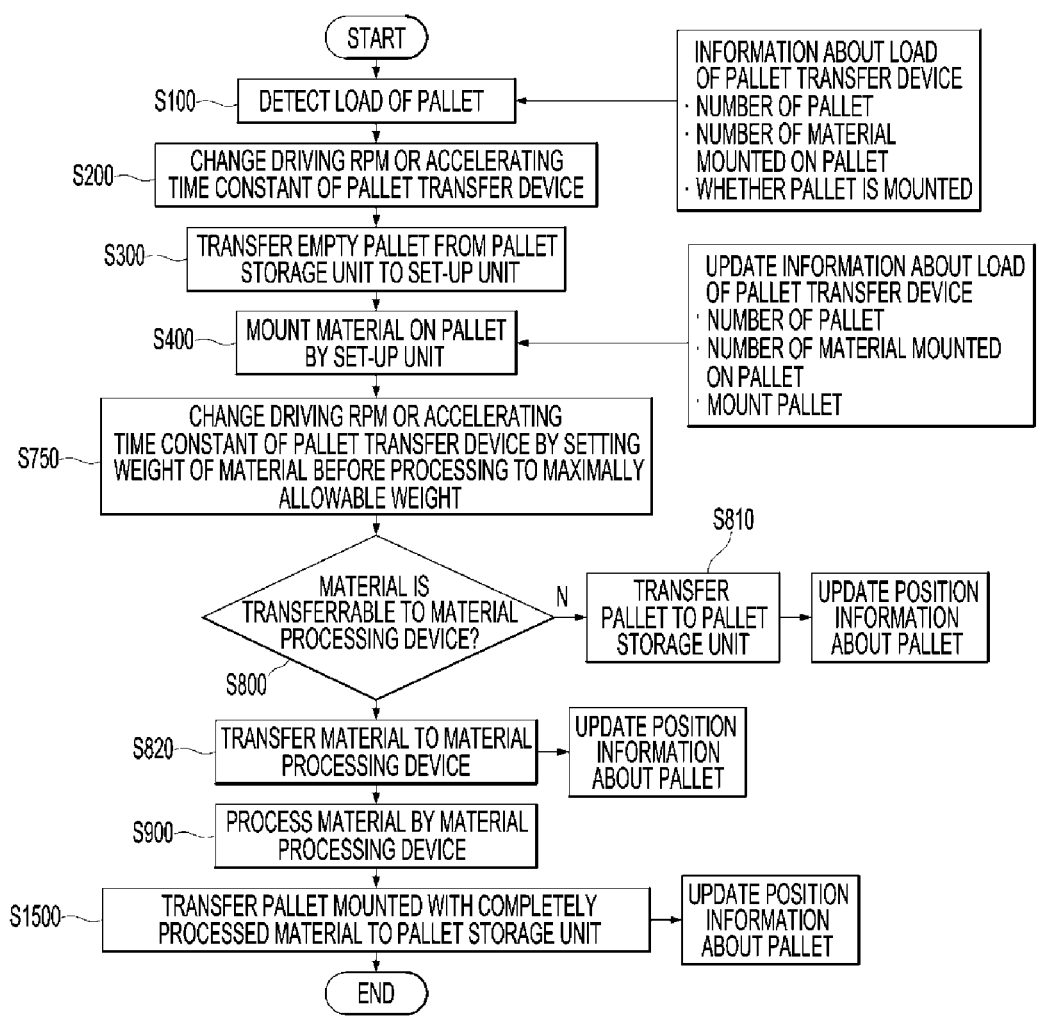
FIG. 3 is a flowchart illustrating an operation process of FIG. 1.

Hereinafter, an operation process of the pallet transfer system 101 according to the first exemplary embodiment of the present disclosure will be described with reference to FIG. 3.

Whether a material is mounted on a pallet is detected (S100). In this case, whether the material is mounted on the pallet is determined by detecting a load applied to the pallet transfer device based on number information about a pallet, number information about a material mounted on the pallet, or whether a material is mounted on the pallet.

When it is determined that the pallet is empty according to a result of detecting whether the material is mounted on the pallet, a driving RPM or an accelerating time constant of the pallet transfer device is changed to that of a case where the pallet is empty (S200).

In this case, the driving RPM or an accelerating time constant of the pallet transfer device in the case where the pallet is empty uses a value set in the pallet transfer device.

The pallet transfer device transfers the empty pallet loaded in the pallet storage to the set-up structure, which is capable of inserting the material into or withdrawing the material out from the pallet (S300).

An operator mounts a material on the empty pallet, which is transferred to the set-up structure (S400).

In this case, the number information about the pallet, the number information about the material mounted on the pallet, the information about whether the material is mounted on the pallet, or the current position information about the pallet is updated.

The driving RPM or the accelerating time constant of the pallet transfer device is changed to that of a case where a material having maximally allowable weight is mounted on the pallet (S750).

In this case, it is assumed that the material having the maximum weight is mounted on the pallet, and a predetermined driving RPM or accelerating time constant of the pallet transfer device is used as a set value of the pallet transfer device.

It is detected whether the pallet mounted with the material may be transferred to the material processing device by detecting an operation state of the material processing device (S800).

In this case, when the detected operation state of the material processing device indicates that the pallet transfer device cannot transfer the pallet mounted with the material to the material processing device, the pallet transfer device transfers the pallet mounted with the material to the pallet storage (S810). Particularly, this case may be a case where the pallet, which is mounted with the material waiting for processing by the material processing device, stands by in front of the plurality of material processing devices or a case where a place, at which the pallet mounted with the material stands by, is insufficient.

The position information about the pallet transferred to the pallet storage is updated.

When the detected operation state of the material processing device indicates that the pallet transfer device is capable of transferring the pallet mounted with the material to the material processing device, the pallet transfer device transfers the pallet mounted with the material to the material processing device (S820).

The position information about the pallet transferred to the material processing device is updated.

The material processing device processes the material mounted on the pallet transferred to the material processing device (S900).

The completely processed material is mounted on the pallet and transferred to the pallet storage by the pallet transfer device.

In this case, the position information about the pallet transferred to the pallet storage is updated.

By the aforementioned operation process, the pallet transfer system 101 according to the first exemplary embodiment of the present disclosure may effectively control a transfer speed of the pallet transfer device.

Figure 4:
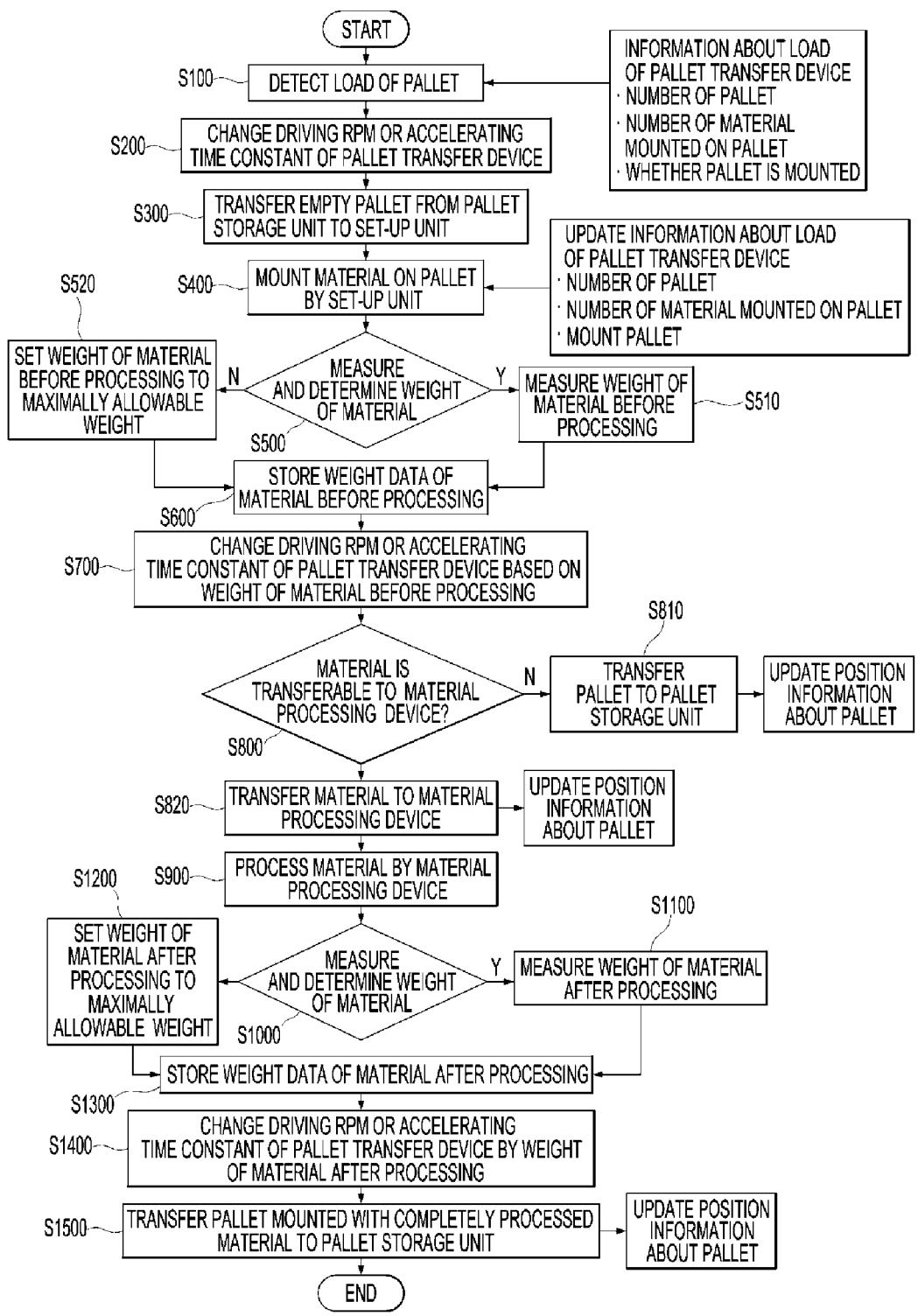
FIG. 4 is a flowchart illustrating an operation process of FIG. 2.

Hereinafter, an operation process of the pallet transfer system 102 according to the second exemplary embodiment of the present disclosure will be described with reference to FIG. 4.

Whether a material is mounted on a pallet is detected (S100). In this case, whether the material is mounted on the pallet is determined by detecting a load applied to the pallet transfer device based on number information about a pallet, number information about a material mounted on the pallet, or whether a material is mounted on the pallet.

When it is determined that the pallet is empty according to a result of detecting whether the material is mounted on the pallet, a driving RPM or an accelerating time constant of the pallet transfer device is changed (S200).

In this case, the driving RPM or the accelerating time constant of the pallet transfer device in the case where the pallet is empty is determined based on Equations 1 and 2 as described above.

The pallet transfer device transfers the empty pallet loaded in the pallet storage to the set-up structure, which is capable of inserting the material into or withdrawing the material out from the pallet (S300).

An operator mounts a material on the empty pallet, which is transferred to the set-up structure (S400).

In this case, the number information about the pallet, the number information about the material mounted on the pallet, the information about whether the material is mounted on the pallet, or the current position information about the pallet is updated.

It is determined whether a detector, which is capable of detecting a weight of the material, exists (S500).

When the weight of the material is detectable, the weight of the material detected by the detector is measured (S510).

The detected weight of the material is stored as a weight of the material before processing (S600).

When the weight of the material is not detectable, a weight of the material before processing is set to a maximally allowable weight of the material mountable on the pallet of the pallet transfer device (S520).

The maximally mountable weight is stored as a weight of the material before processing (S600).

The driving RPM or the accelerating time constant of the pallet transfer device is determined based on Equations 1 and 2 as described above (S700). In this case, a weight E of the material currently laid on the transfer device is a value stored as the weight of the material before processing. Further, the weight maximally mountable on the pallet is a predetermined value.

It is detected whether the pallet mounted with the material may be transferred to the material processing device by detecting an operation state of the material processing device (S800).

In this case, when the detected operation state of the material processing device indicates that the pallet transfer device cannot transfer the pallet mounted with the material to the material processing device, the pallet transfer device transfers the pallet mounted with the material to the pallet storage (S810).

The position information about the pallet transferred to the pallet storage is updated.

When the detected operation state of the material processing device indicates that the pallet transfer device is capable of transferring the pallet mounted with the material to the material processing device, the pallet transfer device transfers the pallet mounted with the material to the material processing device (S820).

The position information about the pallet transferred to the material processing device is updated.

The material processing device processes the material mounted on the pallet transferred to the material processing device (S900). In this case, a processing program utilized by the material processing device is updated.

It is determined whether a weight of the material (completely processed workpiece) passing through the material processing device is detectable (S1000).

When it is determined that the weight of the material passing through the material processing device is detectable, a weight of the material after the processing is detected (S1100).

The detected weight of the material is stored as a weight of the material after processing (S1300).

When it is determined that the weight of the material passing through the material processing device is not detectable, a weight of the material after processing is set to a maximally allowable weight of the material mountable on the pallet of the pallet transfer device (S1200).

The maximally mountable weight is stored as a weight of the material after processing (S1300).

The driving RPM or the accelerating time constant of the pallet transfer device is determined based on Equations 1 and 2 as described above (S1400). In this case, a weight E of the material currently laid on the transfer device is a value stored as the weight of the material after processing. Further, the weight maximally mountable on the pallet is a predetermined value.

The completely processed material is mounted on the pallet and transferred to the pallet storage by the pallet transfer device.

In this case, the position information about the pallet transferred to the pallet storage is updated.

By the aforementioned operation process, the pallet transfer system 102 according to the second exemplary embodiment of the present disclosure may precisely control a transfer speed or transfer acceleration of the pallet transfer device by effectively detecting or calculating a weight of a material before and after processing by the material processing device.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A pallet transfer system, comprising:
a pallet storage arranged along a path for transferring a pallet and having a plurality of pallets loaded therein;
a material processing device arranged along the path, the material processing device comprising a machine tool to process the material mounted on the pallet;
a pallet transfer device installed on the path and configured to mount the pallet thereon and move along the path so as to transfer the mounted pallet to the pallet storage, or the material processing device;
a detector installed on the pallet transfer device and configured to detect information on a load applied to the pallet transfer device;
a controller connected with the pallet transfer device and the detector, and configured to control a transfer speed of the pallet transfer device according to load information detected by the detector; and
an input device connected with the controller and configured to input predetermined load information to be applied to the pallet transfer device,
wherein, when the load information is not detected by the detector, the controller controls the transfer speed of the pallet transfer device based on the predetermined load information input by the input device.

2. The pallet transfer system of claim 1, wherein the detector detects at least one selected from the group consisting of whether a pallet is mounted on the pallet transfer device, whether a material is mounted on the pallet, a weight of a material mounted on the pallet, a number of the pallet, and a number of material mounted on the pallet.

3. The pallet transfer system of claim 2, wherein the controller calculates a weight of the material after processing by using a processing program input into the material processing device.

4. The pallet transfer system of claim 1, wherein the detector includes: a first detection member configured to detect a weight of the material before processing; and a second detection member configured to detect a weight of the material after processing.

5. The pallet transfer system of claim 4, wherein the first detection member and the second detection member are installed in the material processing device.

6. The pallet transfer system of claim 1, wherein the controller controls one or more of a driving revolutions per minute (RPM) and an accelerating time constant of the pallet transfer device.

7. The pallet transfer system of claim 6, wherein the driving RPM or the accelerating time constant of the pallet transfer device is calculated by Equation 1 or 2 below:

$$H = C + (F - C)*(J - E/B - A) \qquad \text{Equation 1}$$

$$I = D + (G - D)*(J - E/B - A) \qquad \text{Equation 2}$$

where A is a weight of an empty pallet, B is a weight of pallets when materials are maximally loaded, C is an appropriate driving RPM of the pallet transfer device when the materials are maximally loaded, D is an appropriate accelerating time constant of the pallet transfer device when the materials are maximally loaded, E is a weight of a material currently laid on the pallet transfer device, F is an appropriate driving RPM of the pallet transfer device when an empty pallet is transferred, G is an appropriate accelerating time constant of the pallet transfer device when an empty pallet is transferred, H is a driving RPM of the pallet transfer device, I is an accelerating time constant of the pallet transfer device, and J is a weight of materials when materials are maximally loaded.

8. The pallet transfer system of claim 1, wherein the controller determines a transfer position of the pallet by detecting an operation state of the material processing device, and controls a transfer position of the pallet transfer device.

9. The pallet transfer system of claim 1, further comprising:
   a setup station arranged along the path, the setup station enabling a user to mount a material onto the pallet among the plurality of pallets and enabling the user to withdraw the loaded material out from the pallet.

10. The pallet transfer system of claim 9, wherein the detector includes:
   a first detection member configured to detect a weight of the material before processing; and
   a second detection member configured to detect a weight of the material after processing.

11. The pallet transfer system of claim 10, wherein the first detection member and the second detection member are installed in the setup station.

\* \* \* \* \*